Sept. 26, 1950  J. H. STARR  2,523,453
CALCULATING TABLE AND THE LIKE
Filed Nov. 12, 1947  6 Sheets-Sheet 1

INVENTOR.
James H. Starr,
BY
Atty.

Sept. 26, 1950        J. H. STARR        2,523,453

CALCULATING TABLE AND THE LIKE

Filed Nov. 12, 1947        6 Sheets-Sheet 4

Fig. 6.

INVENTOR.
James H. Starr,
BY
Thos. A. Lanning Jr
ATTY.

Sept. 26, 1950  J. H. STARR  2,523,453
CALCULATING TABLE AND THE LIKE

Filed Nov. 12, 1947  6 Sheets-Sheet 5

INVENTOR.
James H. Starr,
BY
Thos. A. Banning Jr.
Atty.

Fig. 12.

Patented Sept. 26, 1950

2,523,453

UNITED STATES PATENT OFFICE 2,523,453

CALCULATING TABLE AND THE LIKE

James H. Starr, La Grange, Ill.

Application November 12, 1947, Serial No. 785,464

9 Claims. (Cl. 235—61)

This invention relates to improvements in calculating boards or tables, and the like. The invention concerns itself primarily with improvements in alternating current operated boards wherein provision is made for simulating elements of a real network, and for making adjustments of said elements to simulate the conditions of impedance existing in said real network elements as well as making various measurements of currents and potentials from which indications of conditions existing in the simulated real network may be obtained.

Generally speaking the impedance of any section of the real network, $R+JX$, is simulated by a corresponding section of the miniature network of impedance $r+jx$, where the relation $r/R=x/X=$ a constant, and where the same constant applies to all branches of the network. Heretofore the resistance components of the impedances of the real network have been represented by rheostats, and the reactive components have been represented by adjustable inductances which have usually consisted of one or two coils with iron cores having air gaps to reduce saturation, and tapped windings. In some instances the dimensions of the air gaps have been adjustable to further aid in adjusting the inductance to the desired value. The details of several such structures currently in use are described in the literature on this subject.

Certain disadvantages are inherent in the structures currently being employed and briefly described as above. The losses in the coil structure, including both copper losses in the coil proper and iron losses in the core, appear as an undesired resistance component of the impedance, and usually must be compensated for by a readjustment of the rheostat provided to represent the resistance. The iron losses vary with the core density which in turn varies with the current flowed through the element. Since the current is frequently the independent variable, such variation in impedance of the simulating coil structure cannot readily be compensated for and must be minimized by use of low core densities and careful design. Also, the inductance of the coil assembly is composed of the inductance due to flux in the core which links all active turns, and that flux wholly or partially in air and linking only a part of the turns. As the number of turns or the core gap are varied the ratio between the total and partial linkages varies in a complex manner, with the result that the adjustment of inductance is not readily predictable as a simple function of active turns and gap length. For reasons which are obvious from the above, the disadvantages mentioned are decidedly more serious in reactive units providing relatively large values of inductance. This fact has contributed to the selection of base impedance values which are relatively low—that is, the ratio $r/R=x/X=$ a constant is normally smaller in magnitude than would be desirable from other considerations.

The effect of maintaining the above ratio at a low value is to increase the current in each calculating board circuit. This relatively large base has not been regarded as a serious objection heretofore because another factor has also tended to encourage the use of larger currents, such as of the order of amperes instead of milliamperes. This second factor has been the characteristics of available metering equipment, the impedance of which has been regarded as too great to permit its insertion into any selected branch of the miniature network without incurring unacceptably large insertion errors, except when the large current base is employed. In my co-pending application for Improvements in Calculating Tables, and the Like, Serial No. 770,850, filed August 27, 1947, I have disclosed structures through the use of which metering may be accomplished without insertion errors, and with any selected current base. Another method of reducing or eliminating insertion errors has been proposed in the literature and incorporated in a few existing practical calculating boards. It comprises the insertion of a thermionic amplifier between the instrument equipment and miniature network. These arrangements permit the use of much larger impedance bases than have heretofore been regarded as practicable, except as may be imposed by the previously mentioned difficulty in providing inductance units of large inductance values.

The advantages flowing from the use of small current bases are several. Obviously the copper losses of all components of the calculating board vary with the square of the currents and inversely as the resistance of such components. As an increase of impedance base is a natural consequence of decrease of current base, voltage being held at a present level, the actual losses of a complete calculating board will be roughly proportional to the current base selected. The reduction in losses made by the reduction in current base is immediately reflected in a reduction in required ability of the individual components to dissipate these losses as heat. Therefore such reduction in current base makes for a very substantial reduction in space requirements and manufacturing costs. Equally important is the fact that the resistance of interconnecting leads and contacts produces voltage drops which are proportional to the magnitude of currents carried, and these voltage drops cause errors in the results, which errors, in particular instances have been found to be significant. The deterioration of a contact with lapse of time is adversely affected by its temperature as is well known; and such deterioration leads to increased resistance and further increased heating which further increases the resistance and the errors. Thus a vicious cycle of deterioration occurs. This undesired sequence is materially reduced by a reduction of current magnitude by reduction of current base.

Other advantages flowing from the use of small current bases are found in the allowable proportionate reduction in the dimensions and costs of the several voltage sources which are necessary parts of a calculating board of the alternating current type. These voltage sources are normally polyphase stators with single phase windings on the respective rotors, said rotors being locked at any desired point to permit adjustment of the phase position of the delivered voltage which is taken from the so-locked rotor. To avoid undesirable effects from reactance of the rotor winding it is necessary to operate the complete voltage source at low electric and magnetic densities, and thus rather large and expensive units have been employed. As the voltage drops are proportional to current magnitude, any reduction in current magnitude consequent on the use of a smaller current base will permit a corresponding reduction in cost and weight of the voltage source units without increased error from internal reactance.

Generally speaking the present invention covers improvements in the elements employed in the calculating board to simulate the inductive reactance components in the real network. As will presently appear, the improvements herein disclosed permit the use of a high impedance base with a correspondingly low current base, and without introducing any of the disadvantages inherent in the constructions heretofore employed, and briefly described in the preceding paragraphs. Since a typical alternating current calculating board may be expected to employ something over one hundred elements for the purpose of simulating inductive reactance, the importance of any reduction in cost or space requirements in these elements is of itself of substantial value, in addition to the other previously mentioned advantages. At this point I may mention that briefly stated my present improvements involve the use, in my calculating board elements, of the conjugates of corresponding impedance elements, either inductive or capacitive, together with the necessary connections and means to bring these conjugate elements into correct values to simulate the values of corresponding impedance elements of the real network, but in conjugate form and value, and together with the means to produce necessary indications of current and voltage values when using such conjugate elements. The following further statements will show certain benefits flowing from such inversions, and from the use of such conjugate elements, and will relate such conjugate elements to the discussion already given.

In a real network the impedance of a typical branch may be expressed as $R+JX$. In a calculating board as heretofore constructed this impedance is represented as $r+jx$. The current in such branch of the real network may be expressed as $I'-JI''$ where the minus sign indicates lagging power factor, a frequent condition. In the calculating board this is represented by $i'-ji''$. The voltage drop across the element in the real network is then $$(I'-JI'')(R+JX) = (RI'+XI'') + J(XI'-RI'')$$

The corresponding relation in the typical calculating board is $$(i'-ji'')(r+jx) = (ri'+xi'') + j(xi'-ri'')$$

I propose to use, in the calculating board network, impedances which are proportional to the conjugates of corresponding impedances of the real network. Therefore I propose to represent the impedance $R+JX$ of the real network by $r-jx$ in the miniature network, where $r-jx$ is proportional to the conjugate of the value $r+jx$ heretofore employed. Similarly I propose to represent the current $I'-JI''$ of the real network by $i'+ji''$, which is also the conjugate of practice heretofore employed in such devices. Also, the drop across the element of the miniature network is the product $$(i'+ji'')(r-jx) = (ri'+xi'') - j(xi'-ri'')$$

and this is proportional to the conjugate of the drop obtained in the solution of the same circuit on a conventional calculating board, and has a vector angle equal but opposite in sign to that of the drop in the real network which is being simulated.

It will also be apparent that the use of conjugate impedances throughout will result in currents in the miniature network which are conjugates of those currents which would be present if conjugate impedances were not used in the miniature network. Also the voltage drops in all branches of the miniature network will be opposite in sign of their vector angles to those occurring in the same branches of the real network. For this reason it is also necessary that the angle calibration of indicating instrument equipment and of all adjustable voltage sources be reversed from the angles which would be employed had conjugate quantities not been used.

In comparison with inductive reactance units, the capacitive reactance unit arrangement herein disclosed offers decided advantages among which I may mention the following:

In the calculating board assembly presently to be disclosed in detail the capacitive elements consist of condensers, jacks, and decade switches, all of which are standard commercial items available at small cost through normal trade channels. Space requirements are substantially reduced by the use of capacitive impedances in place of inductive impedances. It is simple and convenient to provide a relatively high impedance base permitting use of low current base and substantial savings in cost and space requirements of all other components of the complete calculating board. The resistance component of commercially available condensers of good quality is very small compared to the capacity reactance of the same items at low to moderate frequencies, and is substantially lower than in the case of inductive coils at similar frequencies. The readily available reactance values of standard condensers permit the use of standard sixty cycle power supply if desired, without greatly increasing the space and cost requirements. Condensers are substantially constant in impedance within their ratings in contrast to iron core coils where saturation, even though minimized by the use of an air gap, is a non-linear factor.

Now it will be apparent that the conjugate form of impedance in a calculating board requires that capacitive reactances in a real network be represented by inductive reactances in the simulating miniature network, with all the disadvantages previously mentioned as inherent in the construction and adjustment of inductive assemblies for calculating board use. In a real practical power system network capacitive reactance of a magnitude sufficient to require representation in miniature in the simulating network on the calculating board does not occur as frequently as does inductive reactance. Thus the disadvantages arising in the representation of capacitive reactance in the real network in conjugate form will arise in a relatively small number of individual circuits, while the advantages of representing inductive reactance in conjugate form will accrue in a much larger number of circuits of the simulating network.

Included among those circuits of a real network having capacitive reactance which must be represented in conjugate form by inductive reactance in the simulating network, are transmission lines of substantial length and having significant distributed capacitive reactance between line conductors and ground. Even in the longest such lines the capacitive reactance to ground is large in comparison to the inductive reactance of the line conductors from terminal to terminal. To represent such a large capacitive reactance in conjugate form would require an inductive element of large reactance. To provide a sufficiently large inductive reactance in the form of an iron cored coil and including, in the form of taps or otherwise, the necessary range of adjustment to simulate the capacitive reactance of any practical length and configuration of transmission line conductors, would be necessarily excessively expensive. Furthermore, the resistance of such a tapped coil structure would vary with the selection of the tap. I have, however, herein disclosed means to provide the desired range of adjustment in a simulating inductive reactance which avoids these disadvantages. This means comprises the use of an inductance and a condenser in parallel, the condenser being adjustable in capacitive reactance. The following further analysis of this arrangement will clarify this description:

When such an inductance or choke is used alone and is connected between a point of 1.0 per unit voltage and ground, it will pass a current which may be resolved into two components. These are $I_p$, in phase with the applied voltage, and $I_q$, in quadrature and lagging behind the applied voltage. When a condenser is connected in parallel with the above choke between the 1.0 per unit voltage and ground, it will pass a current $I'_q$, in quadrature and leading the applied voltage. The sum of these currents in the parallel path is, $I = I_p - J(I_q - I'_q)$. The in-phase component, $I_p$, is independent of the value of the condenser at the frequency and voltage contemplated. With the specific choke considered for a practical application, it is too small to produce a readable deflection of the instruments used in the calculating board. Even so, it is a known quantity and may be subtracted from observed readings but this is believed to be a totally unnecessary refinement.

The $I_q$ portion of the quadrature component is constant at fixed voltage and is independent of the value of the condenser. The $I'_q$ portion is related to the condenser and is directly proportional to the capacity used. If the condenser is varied from zero capacity to that necessary to pass a current equal to $I_q$, the quadrature component varies between $I_q$ and zero and is always lagging. The value of $I_q$ for the particular choke considered for a practical application may be adjusted over a range of condenser capacities which is comparable to the range used in a typical condenser bank herein disclosed to represent a load. This range of about 15/1 appears adequate to represent any normal transmission line which is to be simulated.

The use of a condenser or group of condensers, of adjustable capacitive reactance, in parallel with an inductive reactance element of fixed value, permits the adjustment of the effective reactance of the parallel combination over a wide range of values while the inductance and the resistance of the inductive element remain constant at some convenient fixed values. This fact, together with the previously mentioned fact that the necessity for use of inductive representation of real capacitive circuits is limited to a relatively few cases, permits the use of conjugates, as here disclosed, to substantial overall advantage in cost of manufacture and in space requirements.

I have herein disclosed the features of my present conjugate arrangement as incorporated within calculating boards of practical arrangement. For this purpose the present features have been herein disclosed as will presently appear, in forms of calculating board embodying some of the features of my previously issued Letters Patent of the United States, No. 2,301,470, issued November 10, 1942. My illustration and description of such conjugate impedance arrangements in the forms hereinafter contained is not to be taken as any form of limitation of the use and protection of such conjugate impedance improvements, except as I may hereafter limit myself in the claims.

It will be understood that in order to bring a given element of the miniature network into proper adjustment to simulate a corresponding real network element it is necessary to make provision for adjustment of the capacitive value of such simulating element. This means that the capacitive value of such simulating element must be adjustable within the desired range and also under conditions such that acceptable error values will not be exceeded at any adjusted value. Any acceptable arrangement of variation of the capacitive value of the condenser element may therefore be used. I prefer, however, to make use of a series of condensers of various values for each capacitive element, and to use with them simple switching means whereby these various condensers may be grouped into various groupings as the switch is moved from position to position, thereby securing the adjustment of the ensemble to the required capacitive total value. As will hereinafter appear I prefer and have disclosed an arrangement in which use is made of a number of groups of such fixed value condensers, and the several values of these fixed condensers have been so selected that by successive groupings of them the overall capacitive value of the condenser element may be changed by very small steps from a stated minimum value to a maximum value. I have, in doing this, so chosen these several condensers that a group or groups of them may be used for representation, in conjugate form, of real network values, and another group or groups of these fixed condensers may then be used for securing "vernier" adjustments of the entire ensemble to an exact total capacitance value. I have also so arranged these groups of fixed value condensers that they comprise what may be called "decades," as will presently appear.

It is recognized that commercial condensers are manufactured to rather large tolerances, normally as much as 20%. However, condensers of 10% tolerance are readily available throughout the range selected for the ensemble, but closer tolerances are not obtainable except on special order. The effect of a 10% tolerance in any decade in the ensemble is nominally identical with that of the capacity associated with the corresponding switch position in the next smaller decade of the ensemble. It will presently be seen that, within a range of from 0.027 to 2.70 microfarads it is possible to obtain any desired capacity value within a margin of the order of 1% with any or all individual condensers subject to the full tolerance of 10%. This is further improved by the fact that the smaller capacity condensers of the first or smallest decade are of a size available in so-called mica and silver construction with a standard commercial error of only 5%.

As will presently appear, and in one example of the selection of condenser values hereinafter to be disclosed, one of the decades of the switch is arranged to provide variations of capacity by steps of 0.0003 microfarad from 0.0003 to 0.0027. Succeeding decades of the switch are arranged to provide variations of capacity by steps of 0.003 microfarad from 0.003 to 0.027, and to provide variations of capacity by steps of 0.03 microfarad from 0.03 to 2.70. If the decades providing for adjustments between 0.03 and 2.70 be considered as being intended for normal use, the smaller decades being intended for "vernier" adjustments, then we have available a range from 0.03 to 2.70 microfarads, or a range of substantially 100/1. This range will generally be found to meet the range requirements needed in simulating real networks; but in case a further and higher range may be required it may be secured by provision of another decade in the condenser arrangement. In fact, I contemplate providing a few impedance elements in the miniature network which are thus provided with an extra decade of condensers and switching elements to meet special conditions which may be encountered in special networks.

Other objects and uses of the present invention will appear from a detailed description of the same, which consists in the features of construction and combinations of parts hereinafter described and claimed.

In the drawings:

Figure 5 shows schematically a simple form of calculating board having nine units for simulating real network elements, each of said nine units being provided with the features of the present invention, together with instrument and circuit provisions as disclosed in my issued patent, No. 2,301,470, to accomplish the adjustment of the individual impedance elements to desired simulating values and to measure the distribution of currents in the completed simulating network. This figure indicates a thermionic amplifier inserted ahead of the current responsive indicating instrument to permit the use of a commercially available instrument movement without introducing unacceptable errors when the impedance of the movement is inserted into a network of relatively high impedance. The use of such an amplifier for reduction of instrument insertion error is well known and it is included in the figure for the purpose of illustrating one simple means for incorporation of the features of the present disclosure in a calculating board constructed as disclosed in the issued patent previously mentioned.

Figure 5$^a$ shows a simple calculating board circuit embodying the features disclosed in Letters Patent, No. 2,301,470, and also the features disclosed in my copending application, Serial No. 770,850, as used for alternating current source operation, but modified by inclusion of the conjugate features which constitute a portion of the present application; this Figure 5$^a$ showing only a single network element, but which is characteristic of the conjugate elements of a complete calculating board embodying the features of the present application and the capacitance element or section of this network element being shown in Figure 5$^a$ in block form for simplicity of illustration;

Figure 1:
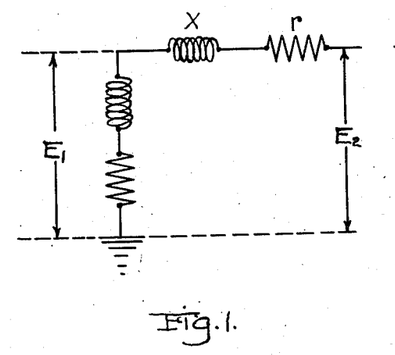
Figure 1 shows schematically a typical network element including a resistance and inductance as represented by an element of a calculating board in conventional form.
Figure 2:
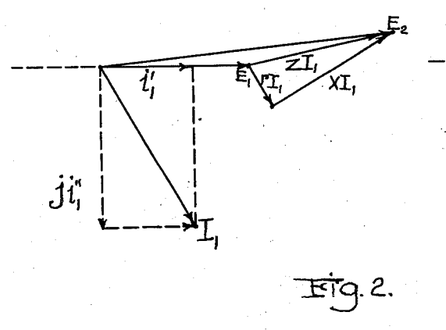
Figure 2 shows a vector diagram of the typical inductive circuit element shown in Figure 1.

In Figure 1 I have shown a typical inductive circuit as represented on a calculating board of conventional design, in which inductive reactance is represented as being truly inductive. In this case the voltage $E_1$ is impressed on an inductive load circuit resulting in a current $I_1$ which lags the impressed voltage. This current would be represented in complex form by the expression $i'_1 - ji''_1$. If the load is supplied from a source over a circuit of impedance consisting of a resistance $r$ and an inductance $x$, represented in complex form as $r + jx$, the resulting drop is shown in Figure 2 as the vector sum of the two drops $rI_1$ and $xI_1$. The voltage at the source, $E_2$, is the vector sum of the voltage at the load $E_1$ and the drop $ZI_1$, and is seen to lead the delivered voltage.

Figure 3:
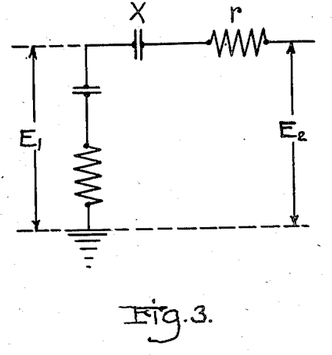
Figure 3 shows schematically the network element of Figure 1, but with the inductance represented in conjugate form by corresponding capacitive elements.

Now in Figure 3 I have shown the same real circuit as it would be represented in a calculating board employing conjugate quantities instead of the true quantities. The voltage at the load, $E_1$, is, arbitrarily shown in the same position as it is shown in Figure 1 and Figure 2. The load impedance is represented by its conjugate, and therefore the load current will lead the applied voltage as shown by $I_1$, having the components $i'_1 + ji''_1$. The impedance between load and source is represented as $r - jx$, using the conjugate of that employed in the preceding paragraph. The resulting drop as shown in Figure 3 is the vector sum of the two drops $rI_1$ and $xI_1$, and is shown to be opposite in vector angle to the corresponding vector of Figure 2. The voltage at the source is shown as $E_2$, and is shown to be the conjugate of the corresponding value in Figure 2.

Figure 4:
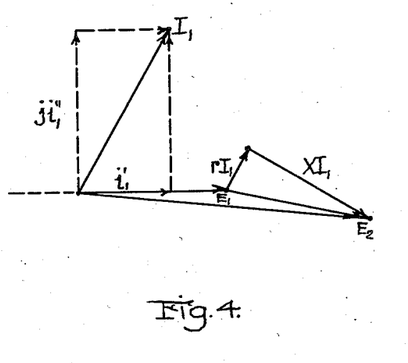
Figure 4 shows a vector diagram corresponding to the conjugate arrangement of Figure 3.

While Figures 2 and 4 are drawn for a simple series circuit, it will be apparent that similar relations will exist in any circuit of any complexity when it is represented with all significant quantities, currents, voltages, and impedances, in conjugate form.

Figure 5:
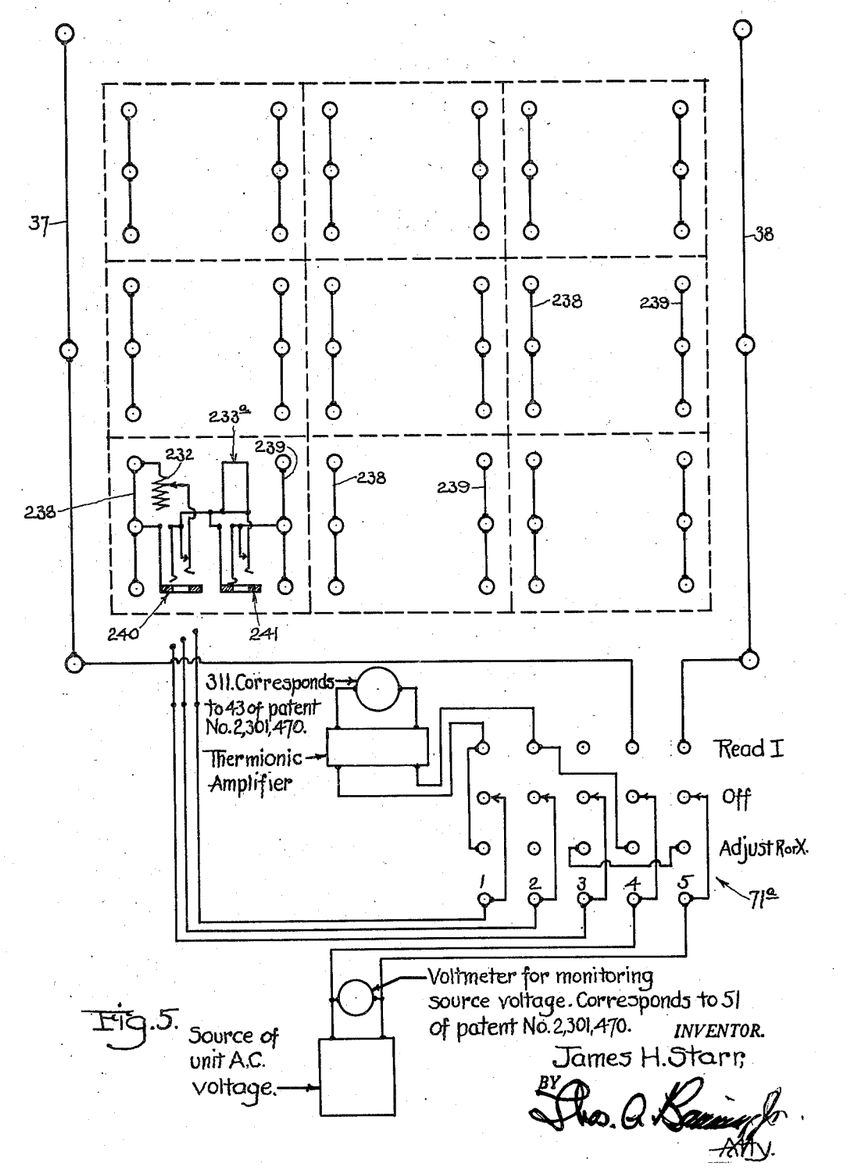

Referring now to Figure 5, I have therein shown an alternating current calculating board consisting of nine elements, each of which may be adjusted to any value of resistance and any value of reactance, within the respective range of such adjustments provided, to properly simulate a real network of not to exceed nine branches. I have shown a single source of unit alternating current potential together with a potential responsive instrument for the purpose of monitoring the terminal voltage of said source. I have also shown a single switch having five electrically independent switch arms which are arranged to operate together in gang to any selected one of the three positions; a current responsive indicating instrument; and a thermionic amplifier in circuit with said instrument. One only of the nine circuit elements is shown in circuit detail to include two jacks indicated as 240 and 241, respectively, a resistance element adjustable in value indicated as 232, and a reactive element adjustable in value and indicated as 233ª. The five pole switch 71ª is shown in the "off" position, and corresponds to the switch designated as 71 in my issued patent, No. 2,301,470. For simplicity in illustration the positions "Adjust plus 0.1" and "Read Total I" of the switch 71 of said issued patent have been omitted from the showing of Figure 5, and the remaining positions will be seen to correspond as indicated in the tabulation below:

| Switch position in Figure 5 of this application | Switch position in Figure 2 of issued Patent, No. 2,301,470 |
|---|---|
| Read I<br>Off<br>Adjust R or X | Branch I<br>Off<br>Adjust Plus 0 |

Figure 6:
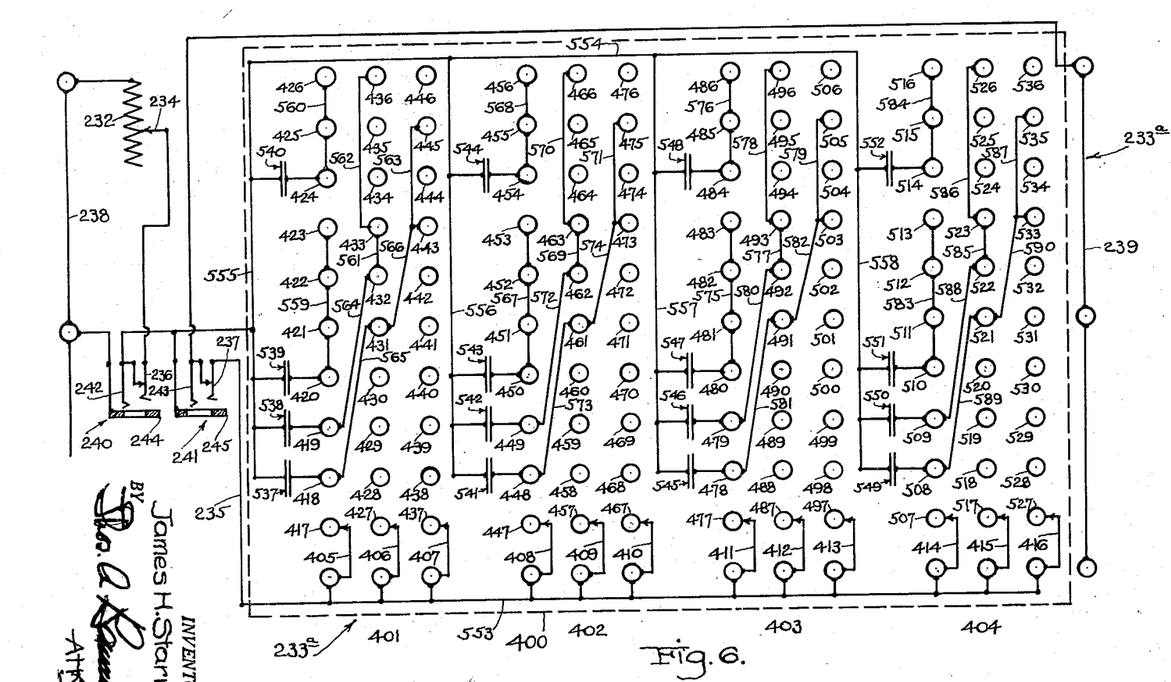
Figure 6 shows the characteristic network element of Figure 5$^a$, but with the capacitance element shown in full detail including switching means connected thereto for enabling the capacity of this element to be adjusted as needed.

For the purposes of this description, the reactance element 233ª may be either inductive or capacitive, but I prefer to employ capacitive reactance for the reasons previously stated, and in Figure 6 hereof a detail is shown of the contents of the rectangular box indicated as 233ª in Figure 5. This Figure 6 will be described in detail presently hereinafter.

I have also shown in Figure 5 terminals 238 and 239 whereby the nine impedance elements may be conveniently interconnected in any desired configuration to simulate a real network, all as described and illustrated in said issued patent. When so interconnected, the following circuit continuities may be traced:

When the plug associated with the three conductor cord is inserted into jack 240, and the five pole switch is moved to the position indicated as "Adjust R or X," a circuit is completed from the potential source through pole 5 of the switch to pole 3 of the switch to the sleeve or jack 240, through the resistance 232 to the tip of jack 240, through the tip lead of the cord, through pole 1 of the switch to the thermionic amplifier and thence through pole 4 of the switch, returning to the potential source. This is an exact duplicate of the circuit found in the disclosure of my issued patent, No. 2,301,470, when switch 71 thereof is in the "Adjust Plus 0" position, except that the circuit is presently completed to a thermionic amplifier instead of directly to the current responsive indicator 43 of the issued patent. In the present application the amplifier output is impressed upon the instrument 311 the indication of which is, preferably, linearly related to the current supplied to the amplifier input terminals and the amplifier is introduced to reduce or eliminate the insertion error of the instrument when inserted directly into the circuit. As disclosed in the issued patent, the instrument 311 may be furnished with a suitable scale, reciprocally related to the magnitude of current flowing in the instrument movement, which may be caused to indicate directly the resistance of the element 232 in Per Unit Z terms, or any other units which may prove convenient.

Had the plug been inserted in jack 241 instead of jack 240, the circuit would be completed as described in the preceding paragraph, except that the reactance element 233ª would have been included in circuit with the amplifier, and the potential source, instead of the resistance element 232. When the reactance is capacitive reactance at frequencies of the order of sixty cycles, the resulting current at the amplifier input terminals will lead the applied voltage by very nearly 90 degrees, that is, any in-phase component of current will be negligibly small. The magnitude of the current flowing in the movement of the instrument 311 will, if we still assume linearity of the amplifier, be reciprocally related to the magnitude of the capacity reactance of the element 233ª, and by use of the same reciprocal form of scale, the instrument will indicate directly the magnitude of such capacity reactance in any terms which may appear appropriate. The vector position of the current fed to the amplifier input with respect to that of the source potential will not affect the indication of the instrument.

If the plug is inserted in either jack, and the switch moved to the position marked "Read I," the circuit from the two sides of the potential source is completed to the two buses 37 and 38 of the issued patent. The current flowing in the particular branch into which the plug has been inserted enters the tip of the plug from the tip contact of the jack and passes to the amplifier through pole 1, returning to the network element through pole 2 and the ring contact of the jack. The instrument 311 indicates the magnitude of this current through the linear action of the amplifier and the circuit corresponds in all respects to that obtained in the issued patent when the switch 71 thereof is in the position "Branch I." Since by introduction of the amplifier, the impedance of the instrument 311 is reduced to a negligibly small magnitude, the current flowing in the branch into which the plug is inserted is not affected in magnitude or in phase by such insertion. The instrument 311 indicates the current magnitude without regard to phase position and the scale provided for such indication would be substantially linear except as it may be modified by the inherent characteristics of the instrument movement or of the amplifier, or both.

Figure 5A:
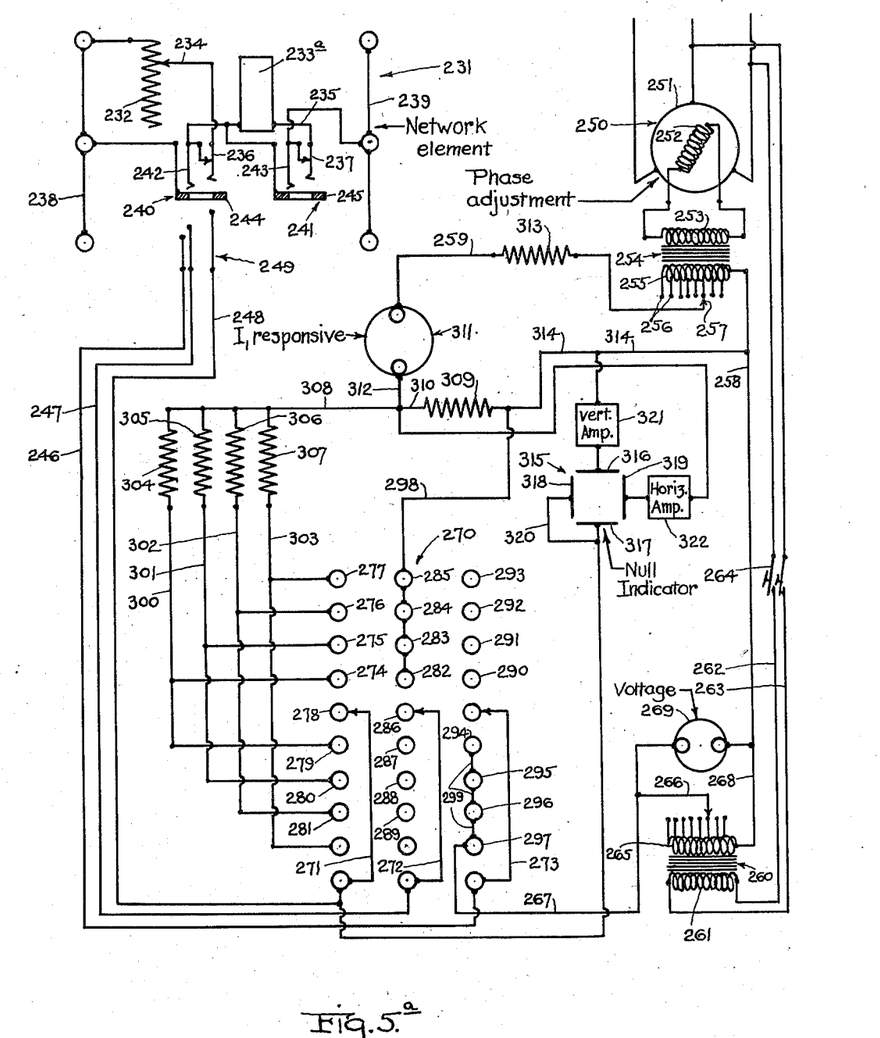

I have shown in Figure 5 one manner of incorporation of the herein disclosed simulation of real impedance in miniature and in conjugate form into a calculating board structure well known in the art and exemplified by my issued patent, No. 2,301,470. A second form of calculating board structure differing in the structure employed for measuring impedance values and current distribution is disclosed in my pending application, Serial No. 770,850. In Figure 5ª hereof I have shown a portion of the structure disclosed in said pending application, particularly Figure 6 thereof, with the exception that I have shown the reactive portion of a typical impedance element as a rectangular box or compartment indicated as 233ª instead of as a reactive coil as in the corresponding figure of the pending application. The contents of the rectangular compartment are shown in detail in Figure 6 of this application, and further described below. It will be seen that the substitution of capacitive reactance in the form of condensers and suitable switching all as shown in Figure 6 hereof for the inductive reactance of Figure 6 of the copending application, results in no changes in the remainder of the structure except only that the sign of calibration of the angular position of the potential source 250 must be reversed. All the previously stated advantages of the simulation of real network impedances in conjugate form are realized in Figure 5ª hereof when incorporated into a calculating board embodying the disclosures of my pending application, Serial No. 770,850.

Referring now to Figure 6 I have therein shown the impedance section 233ª (of Figure 5 or Figure 5ª) in full detail, and also as related to the resistance section of variable quantity. This impedance section is schematically shown as included within the dashed line 400 of Figure 6 for convenience. This dashed line section may be in the form of a box or other suitable and convenient element to comprise a portion of the miniature network element. It includes a number of condensers, preferably each of fixed value in the form now to be explained, suitable "decade" switches, and proper connections between all of these parts. In the form shown I have provided four decades, each including a three contact switch which has a gang of three movable contacts, each of which contacts is movable from a zero or "off" position to any one of nine contacting positions, all three contacts moving in gang form to the selected position; and the form shown in Figure 6 also includes four condensers in each decade.

In detail, the embodiment shown in Figure 6 includes the four independently movable gang switches 401, 402, 403 and 404 for the four decades; and these switches in turn include the contacts or blades 405, 406 and 407; 408, 409 and 410; 411, 412 and 413; and 414, 415 and 416. For the blade 405 there are the contacts 417, 418, 419, 420, 421, 422, 423, 424, 425 and 426; for the blade 406 there are the contacts 427, 428, 429, 430, 431, 432, 433, 434, 435 and 436; and for the blade 407 there are the contacts 437, 438, 439, 440, 441, 442, 443, 444, 445 and 446. For the blade 408 there are the contacts 447, 448, 449, 450, 451, 452, 453, 454, 455 and 456; for the blade 409 there are the contacts 457, 458, 459, 460, 461, 462, 463, 464, 465 and 466; and for the blade 410 there are the contacts 467, 468, 469, 470, 471, 472, 473, 474, 475 and 476. For the blade 411 there are the contacts 477, 478, 479, 480, 481, 482, 483, 484, 485 and 486; for the blade 412 there are the contacts 487, 488, 489, 490, 491, 492, 493, 494, 495 and 496; and for the blade 413 there are the contacts 497, 498, 499, 500, 501, 502, 503, 504, 505 and 506. For the blade 414 there are the contacts 507, 508, 509, 510, 511, 512, 513, 514, 515 and 516; for the blade 415 there are the contacts 517, 518, 519, 520, 521, 522, 523, 524, 525 and 526; and for the blade 416 there are the contacts 527, 528, 529, 530, 531, 532, 533, 534, 535 and 536. It will be understood that all three of the blades 405, 406 and 407 move together in gang, that all three of the blades 408, 409 and 410 move together in gang, that all three of the blades 411, 412 and 413 move together in gang, and that all three of the blades 414, 415 and 416 move together in gang.

For the decade switch 401 there are the fixed condensers 537, 538, 539 and 540; for the decade switch 402 there are the fixed condensers 541, 542, 543 and 544; for the decade switch 403 there are the fixed condensers 545, 546, 547 and 548; and for the decade switch 404 there are the fixed condensers 549, 550, 551, and 552.

There is provided a bus bar 553 to which all of the movable blades 405 to 416, inclusive are connected, so that as said blades are moved to their various selected positions they always maintain connection with this busbar. This busbar is connected to one of the jack elements presently to be described. There is also a busbar 554 to which one side of each of the condensers 537 to 552 is connected so that by connecting the other sides of selected condensers to the busbar 553 the capacitive value or quantity which will be established between the two busbars 553 and 554 is adjusted as required. This result is accomplished by moving the several gang switches of the decades to selected positions.

To facilitate the connections of the various condensers to the busbar 554 I have provided the lines 555, 556, 557 and 558 extending from the busbar alongside of the four decades, respectively, and to which the proper condensers are connected.

The contacts 420, 421, 422 and 423 are connected together by the line 559, the contacts 424, 425 and 426 are connected together by the line 560, the contacts 432 and 433 are connected together by the line 561, the contacts 433 and 436 are connected together by the line 562, and the contacts 443 and 436 are connected together by the line 563. Also, the contacts 432 and 419 are connected together by the line 564, the contacts 431 and 418 are connected together by the line 565, and the contacts 443 and 431 are connected together by the line 566. Likewise, the contacts 450, 451, 452 and 453 are connected together by the line 567, the contacts 454, 455 and 456 are connected together by the line 568, the contacts 462 and 463 are connected together by the line 569, the contacts 463 and 466 are connected together by the line 570, and the contacts 473 and 475 are connected together by the line 571. Also, the contacts 462 and 449 are connected together by the line 572, the contacts 461 and 448 are connected together by the line 573, and the contacts 473 and 461 are connected together by the line 574. Likewise, the contacts 480, 481, 482 and 483 are connected together by the line 575, the contacts 484, 485 and 486 are connected together by the line 576, the contacts 492 and 493 are connected together by the line 577, the contacts 493 and 496 are connected together by the line 578, and the contacts 503 and 505 are connected together by the line 579. Also, the contacts 492 and 479 are connected together by the line 580, the contacts 491 and 478 are connected together by the line 581, and the contacts 503 and 491 are connected together by the line 582. Likewise, the contacts 510, 511, 512 and 513 are connected together by the line 583, the contacts 514, 515 and 516 are connected together by the line 584, the contacts 522 and 523 are connected together by the line 585, the contacts 523 and 526 are connected together by the line 586, and the contacts 533 and 535 are connected together by the line 587. Also, the contacts 522 and 509 are connected together by the line 588, the contacts 521 and 508 are connected together by the line 589, and the contacts 533 and 521 are connected together by the line 590.

The effect of the foregoing connections is that the contacts 420, 421, 422 and 423 comprise a group, the contacts 424, 425 and 426 comprise a group, the contacts 419, 432, 433 and 436 comprise a group, and the contacts 418, 431, 443 and 445 comprise a group. Also, that the contacts 450, 451, 452 and 453 comprise a group, the contacts 454, 455 and 456 comprise a group, the contacts 449, 462, 463 and 466 comprise a group, and the contacts 448, 461, 473 and 475 comprise a group. Also, that the contacts 480, 481, 482 and 483 comprise a group, the contacts 484, 485 and 486 comprise a group, the contacts 479, 492, 493 and 496 comprise a group, and the contacts 478, 491, 503 and 505 comprise a group. Also, that the contacts 510, 511, 512 and 513 comprise a group, the contacts 514, 515 and 516 comprise a group, the contacts 509, 522, 523 and 526 comprise a group, and the contacts 508, 521, 533 and 535 comprise a group.

The free terminal of the condenser 537 is connected to the contact 418, the free terminal of the condenser 538 is connected to the contact 419, the free terminal of the condenser 539 is connected to the contact 420, and the free terminal of the condenser 540 is connected to the contact 424. Also, the free terminal of the condenser 541 is connected to the contact 448, the free terminal of the condenser 542 is connected to the contact 449, the free terminal of the condenser 543 is connected to the contact 450, and the free terminal of the condenser 544 is connected to the contact 454. Also, the free terminal of the condenser 545 is connected to the contact 478, the free terminal of the condenser 546 is connected to the contact 479, the free terminal of the condenser 547 is connected to the contact 480, and the free terminal of the condenser 548 is connected to the contact 484. Also, the free terminal of the condenser 549 is connected to the contact 508, the free terminal of the condenser 550 is connected to the contact 509, the free terminal of the condenser 551 is connected to the contact 510, and the free terminal of the condenser 552 is connected to the contact 514. Consequently these condensers are connected, respectively, to the various contact groups referred to above.

Preferably the condensers of each decade or switch control are of different impedance values. By this means it is possible to obtain decade condensance values depending not only on the individual impedance values of the several condensers themselves, but also on the combinations in which these several individual condensers are grouped in such decade. I shall now mention condenser values for the several condensers 537 to 552, inclusive illustrated herein, but in so doing I do not intend to limit myself to these or any other specific values, and I mention these values as illustrative, only. These illustrative values are as follows:

| Condenser Number (Figure 6) | | Capacity, Microfarads (Illustrative) |
|---|---|---|
| 537 538 539 540 | Decade No. 1 | 0.0003 0.0006 0.0009 0.0021 |
| 541 542 543 544 | Decade No. 2 | 0.003 0.006 0.009 0.021 |
| 545 546 547 548 | Decade No. 3 | 0.03 0.06 0.09 0.21 |
| 549 550 551 552 | Decade No. 4 | 0.3 0.6 0.9 2.1 |

The impedance values stated above are of course the intended values, but, as already mentioned herein, there will be commercial variations from these designated values. However, it will presently be shown that such commercial variations may be made insignificant or may be disregarded by proper use of the entire grouping.

With the values stated above the following successive impedance values may be obtained in the successive decades:

| Switch Position (Figure 6) | Condensers Used (Figure 6) | Capacity, Microfarads (Combined) |
|---|---|---|
| 1) Decade #1 | 537 | 0.0003 |
| 2) | 538 | 0.0006 |
| 3) | 539 | 0.0009 |
| 4) | 539, 537 | 0.0012 |
| 5) | 539, 538 | 0.0015 |
| 6) | 539, 537, 538 | 0.0018 |
| 7) | 540 | 0.0021 |
| 8) | 540, 537 | 0.0024 |
| 9) | 540, 538 | 0.0027 |
| 1) Decade #2 | 541 | 0.003 |
| 2) | 542 | 0.006 |
| 3) | 543 | 0.009 |
| 4) | 543, 541 | 0.012 |
| 5) | 543, 542 | 0.015 |
| 6) | 543, 541, 542 | 0.018 |
| 7) | 544 | 0.021 |
| 8) | 544, 541 | 0.024 |
| 9) | 544, 542 | 0.027 |
| 1) Decade #3 | 545 | 0.03 |
| 2) | 546 | 0.06 |
| 3) | 547 | 0.09 |
| 4) | 547, 545 | 0.12 |
| 5) | 547, 546 | 0.15 |
| 6) | 547, 545, 546 | 0.18 |
| 7) | 548 | 0.21 |
| 8) | 548, 545 | 0.24 |
| 9) | 548, 546 | 0.27 |
| 1) Decade #4 | 549 | 0.3 |
| 2) | 550 | 0.6 |
| 3) | 551 | 0.9 |
| 4) | 551, 549 | 1.2 |
| 5) | 551, 550 | 1.5 |
| 6) | 551, 549, 550 | 1.8 |
| 7) | 552 | 2.1 |
| 8) | 552, 549 | 2.4 |
| 9) | 552, 550 | 2.7 |

It is thus seen that, with the foregoing selection of condenser values I am able to secure combined values from 0.0003 to 0.0027 microfarad in decade No. 1, combined values from 0.003 to 0.027 in decade No. 2, combined values from 0.03 to 0.27 microfarad in decade No. 3, and combined values from 0.3 to 2.7 microfarads in decade No. 4. These combined values are for the several decades considered individually, and not in combinations of decades.

It will be noted that if all four of the decades are used in sequential adjustments it is possible to obtain a combined capacity between the lower limit of 0.0003 microfarad (disregarding the full open or non-shifted switch position, at which the reactance would theoretically be infinity), and the highest limit of 2.9997 microfarads (being the sum of the four high settings of the four decades). If all four of the decades are used it is possible to secure any capacity between these upper and lower limits by steps of 0.0003 microfarad, and on the assumption that all the condensers are of exactly their several rated values.

It is also noted that by using the two highest decades for settings to simulate real network branches, the settings of these two decades may be made by steps of 0.03 microfarad through the range from 0.03 to 2.97 microfarads; and when so used the two lower decades may be used as verniers to secure exact settings, and also to take care of any commercial inaccuracies in the capacities of the several condensers of the two highest decades. It is also noted that with this arrangement it is possible to obtain increments in the capacitance of the combination always of the order of 1% or less, compared to the total desired capacitance. Thus, when the desired capacitance is of the order of 2.7 microfarads, each step of 0.0003 is of the order of 0.01% of the total, and even when the desired total is of the order of 0.3 microfarad such a step of 0.0003 is of the order of 1% of such total, so that in all cases an inaccuracy of 1% or smaller is assured. By provision of a fifth decade of capacitance on the order of a multiple of ten compared to the highest decade herein shown a still greater range of adjustments would be possible, and a still smaller range of inaccuracies assured.

It may be noted that when using the two highest decades for settings, using the two lowest decades for vernier adjustments, the equivalent reactance of the combination of condensers is between 88,600 ohms and 894 ohms, or a range of substantially 100/1, on the basis of 60 cycles operation.

Figure 12:
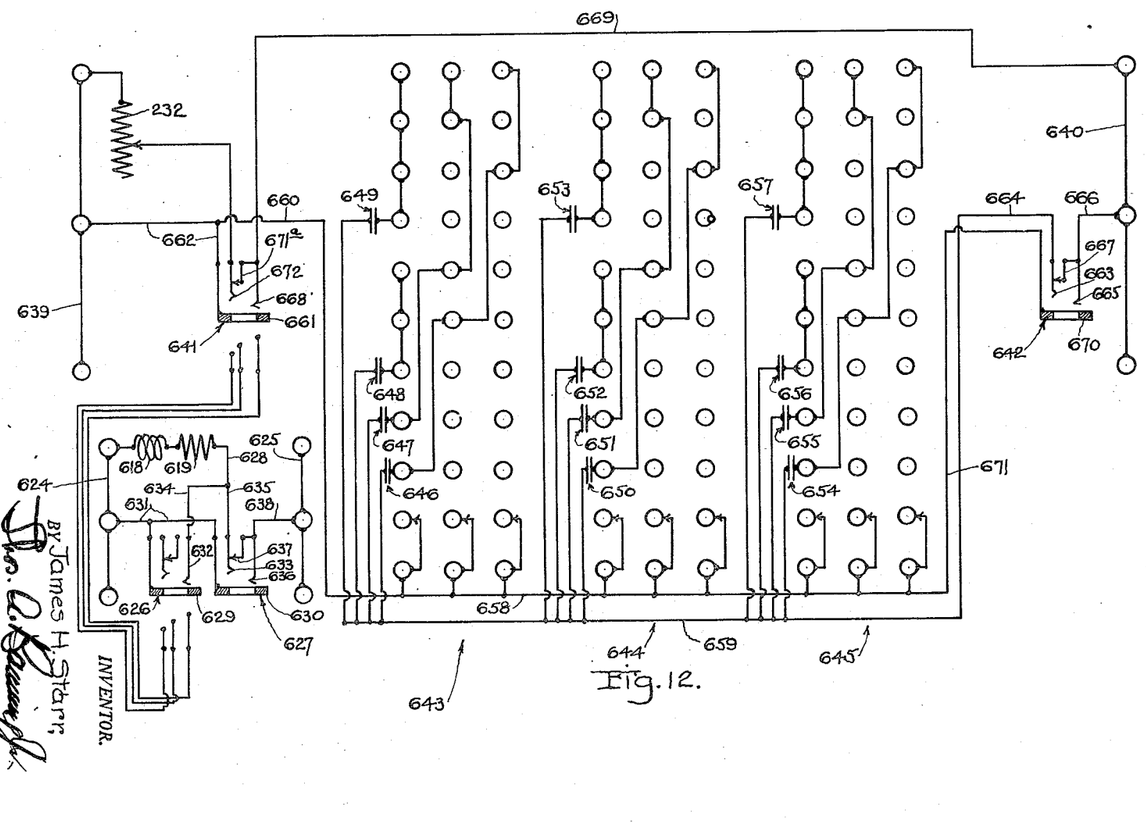
Figure 12 shows schematically a portion of a typical calculating board, namely, one of the simulating elements thereof, in conjugate arrangement, together with certain of the connections to be used with such element; and this figure shows the network element with its resistance and condenser sections normally connected in parallel, which is the preferred arrangement to represent a load in contrast to a series arrangement as used to represent a line or a transformer; and this figure also shows, at the lower left-hand corner thereof, a choke with its unavoidable resistance indicated separately; and this figure shows how, by use of a patch cord the two elements may be connected in parallel with the resistance portion of the main element removed from the circuit.

It will be noted that the form of conjugate impedance arrangement shown in Figures 5 and 5a hereof is well adapted for use in simulating transmission circuits or transformers, wherein the impedance of the simulated circuit is normally available in ohms or per unit values. In the representation of loads, however, the impedance values are not normally directly available, but rather the load data is expressed in kilovoltamperes and power factor, or in kilowatts and reactive kva. It is more convenient in adjusting an impedance element which represents a load, to adjust the resistance and reactance sections independently to those values which, at a stated impressed voltage, permit the passage of the desired active and reactive components of current without reference to the actual ohmic values of the respective sections. To permit such independent adjustments it is preferable to employ a parallel connection of the resistive and reactive elements as shown in Figure 12 rather than the series form shown in Figures 5 and 5a. The advantage of the parallel arrangement for load representation arises from the fact that, in this form, adjustment of either section produces no alteration in the current flowing in the other, a condition not realized in the series form.

In Figure 12 I have shown an arrangement of resistance and reactance elements in which the two independently adjustable sections are connected in parallel. In the figure, the structure permanently connected between the busbars 639 and 640 includes the resistive element 232 with a jack for its convenient adjustment 641, and also includes a capacitive section including a total of 12 condensers 646 to 657, inclusive, together with switching means for the convenient connection of any or all thereof into the simulating network together with jack 642 for the convenient measurement of the reactance of the capacitive section. The structure of Figure 12 differs from that of Figure 6 in that the resistive and capacitive sections are in parallel in Figure 12 and in series in Figure 6, each arrangement affording certain advantages in specific cases, as outlined in the preceding paragraph.

I shall now describe a modified arrangement which is well adapted for simulation of impedances wherein there are relatively large capacitances present in the real network elements, therefore requiring provision for simulation of such capacitancs in conjugate form in the miniature network. For this purpose reference may first be had to Figures 7, 8, 9, 10 and 11.

Figure 7:
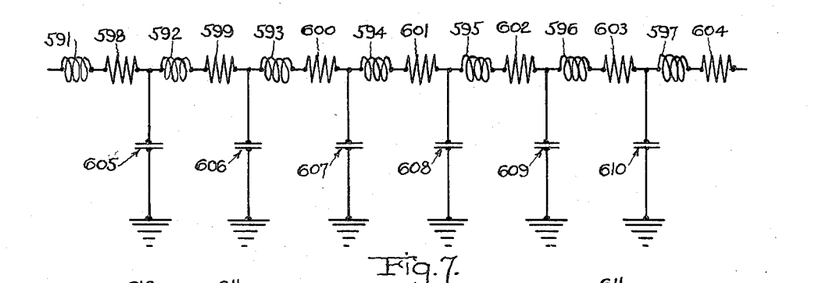
Figure 7 shows a typical transmission line having a substantial amount of distributed capacity, and it shows said line schematically with distributed constants.

In Figure 7 I have shown schematically a transmission line having a substantial amount of line-to-ground distributed capacity. In this figure the line is conveniently shown as comprising a series of sections, each of which has an impedance consisting of a resistance and an inductance in series; and each of these sections has an equivalent line-to-ground capacity represented by the condenser showing in Figure 7. The impedances are numbered 591, 592, 593, 594, 595, 596 and 597, respectively, and the resistances are numbered 598, 599, 600, 601, 602, 603 and 604, respectively. The distributed capacity to ground is shown by the condensers numbered 605, 606, 607, 608, 609 and 610, respectively, and connected to points between the successive resistance, inductance elements.

Now it is well known that such a distributed line-to-ground capacity may be represented in equivalent form by considering that it comprises two capacities between the line ends and ground, and by considering the total line impedance to be represented by a consolidated impedance comprising an equivalent resistance and an equivalent inductance. Accordingly, in Figure 8 I have made such an equivalent representation. In this figure the consolidated resistance is shown at 611, and the consolidated inductance by the inductance 612, in series; and I have shown the equivalent capacitances to ground by the two condensers 613 and 614. The showing of Figure 8 is therefore a showing of the entire line conditions, including distributed capacity to ground, in equivalent form, and in conventional form, that is, inductance shown by inductance, and capacitance shown by capacitance.

Figure 8:
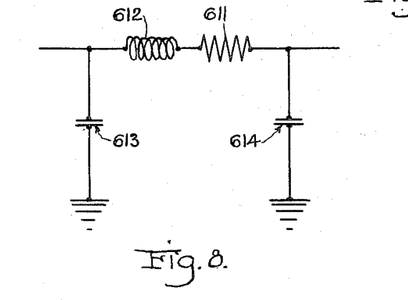
Figure 8 shows an equivalent representation of the transmission line of Figure 7, but with the distributed capacity of the entire line represented by capacitances at the ends of the line; the inductance and resistance components of the transmission line being shown in conventional form.
Figure 9:
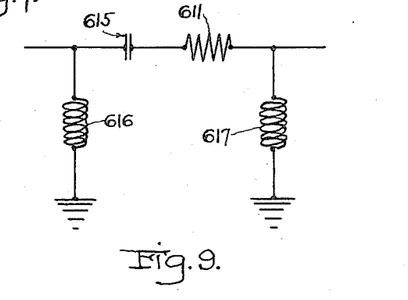
Figure 9 shows the equivalent representation of Figure 8, but with the impedance elements shown in conjugate form.

In Figure 9 I have shown the representation of Figure 8, but in conjugate form. That is, the inductance 612 is shown by the equivalent condenser 615, the resistance 611 is shown as before, and the two equivalent condensers are shown in conjugate form by the line-to-ground inductances 616 and 617. The form of condenser arrangement heretofore described in Figure 6 and elsewhere may be used for representation of the capacitance and resistance 615—611 of Figure 9, by use of one of the condenser arrangements of said Figure 6, so that the desired combination of resistance and capacitance may thereby be secured; but I have already shown that the use of variable inductances or chokes in such an arrangement as that of Figure 9, to simulate the inductances 616 and 617 in conjugate form presents some difficult and objectionable problems from a practical standpoint. Therefore, while it is possible to provide an arrangement including variable chokes or inductances to simulate the elements of Figure 9, including the chokes 616 and 617, I prefer to make use of another arrangement for simulation of these variable choke representations, which I shall now describe in detail. For this purpose reference may be had to Figures 10 and 11.

Figure 10:
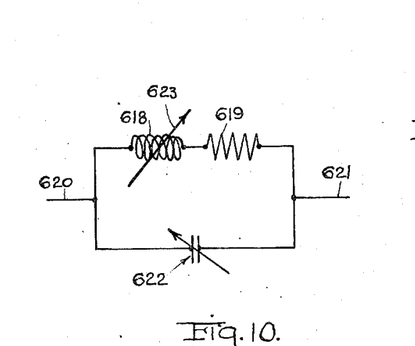
Figure 10 shows schematically one of the conjugate elements herein disclosed for simulation of the inductances shown in the conjugate schematic showing of Figure 9.

In Figure 10 I have shown a series-parallel arrangement intended for use to replace each of the elements 616 and 617 of Figure 9. This series-parallel arrangement includes the inductance 618 and its inherent resistance 619 shown in series with each other and comprising a branch between the terminals 620 and 621, and a variable condenser 622 comprising the other branch between said terminals. This variable condenser may be continuously variable, or may comprise a group of fixed condensers such as the decade arrangement shown in Figure 6. In any case, however, the capacitance of this element is adjustable to the required value. Now if the inductance of the element 618 be of fixed amount of value great enough to meet the maximum conditions which will be met in the calculating board position where such element of Figure 10 is to be used, it is evident that by making the capacity of the condenser 622 zero, the inductance of this series-parallel element will be that of the inductance 618 alone (including its resistance 619). Then, by bringing the condenser into the parallel circuit with this inductance the overall impedance of the entire unit may be adjusted to that value, inductive in form, which will be equivalent to the desired inductance value for the unit 616 (or 617, as the case may be). Thus, the overall inductance of this series-parallel element may be readily adjusted by merely adjusting the condenser element 622, which adjustment may be very readily made, and with all the attendant advantages of use of a variable capacitance instead of a variable inductance, as already explained herein.

Figure 11:
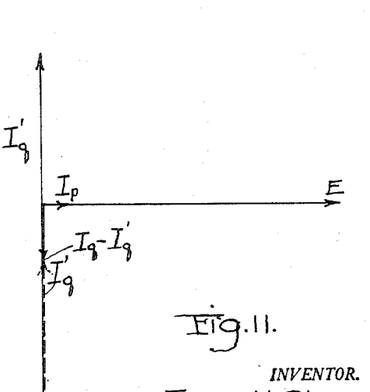
Figure 11 shows a vector diagram corresponding to the arrangement shown in Figure 10.

The functional analysis of this series-parallel arrangement will be better understood from the following:

When such a choke (as that of Figure 10, numeral 618) is used alone and is connected between the terminals 620 and 621, of 1.0 per unit voltage, it will pass a current which may be resolved into two components, namely, $I_p$ in phase with the applied voltage, and $I_q$ in quadrature and lagging the applied voltage. This is the condition when the condenser has a capacity of zero. Then, when the condenser 622 is connected in parallel with the above choke (and its necessary resistance) between said terminals 620 and 621, with 1.0 per unit voltage, the combination will pass a current $I'_q$ in quadrature and leading the applied voltage. Then the sum of these two currents in the two parallel paths is, $I = I_p - j(I_q - I'_q)$. This relation is shown in vector form in Figure 11, wherein the component of current $I_q$ is in phase with the applied voltage, the component $I_q$ is the lagging quadrature component due to the inductive element 618, and the component $I'_q$ is the leading quadrature component due to the momentary value of the capacitance of the element 622. Evidently the difference between the components $I_q$ and $I'_q$ is as shown in Figure 11, and by making the element 618 of sufficiently large and fixed value this difference may be made always of lagging quality, as shown in Figure 11, thus ensuring the provision of a variable lagging component, but of variable amount as determined, not by variation of the inductive element 618, but rather by variation of the condenser element 622, with all the attendant advantages of such an arrangement.

I wish here to point out, that although this arrangement of Figure 10 which substitutes for the inductive elements 616 and 617 of Figure 9, or elsewhere in the calculating board where it may be used, comprises an arrangement in which use is made of a variable condenser for securing the adjusted value of the impedance in question, still in fact the arrangement of this Figure 10 is an inductive element (as long as the impedance value of the element 618 is less than the impedance value of the element 622; so that I am thus able to make provision for adjustment of the value of the real capacity, in conjugate form, by adjustment of another capacitive element in the calculating board. Thus, I am able to use condensers for simulating the inductances of the real network in conjugate form; and also I am able to use adjustable condensers for simulating the capacitances of the real network, such adjustable condensers of the calculating board being properly used in combination with inductances of sufficient, but generally fixed values. In this connection I here point out, that in case it should be found desirable, the inductive value of the element 618 may be made variable, or two or more such inductances may be provided, either or both of which may be used in the series-parallel arrangement of Figure 10; and therefore I have shown, by the arrow 623 in Figure 10, that if desired the inductance of the element 618 may also be adjustable or changed, in combination with the variable or adjustable condenser element 622.

In Figure 12 I have shown one arrangement of circuits and jacks whereby such an arrangement as that of Figure 10 may be readily used in a calculating board of the general form of that disclosed in my issued patent, No. 2,301,470, as well as other forms of calculating board. In this Figure 12 I have shown an adjustable value condenser arrangement which is usable in connection with various forms of circuit arrangements. This showing of Figure 12 also includes a separately adjustable resistance 232 which is normally in parallel with the condenser element, as distinguished from the overall arrangement shown in Figure 6, in which Figure 6 the resistance and condenser, while being separately adjustable, are nevertheless normally in series connection with each other. I have also, in Figure 12 shown a special unit, corresponding to the inductance element and its inherent resistance 618—619 of Figure 10, which special unit of Figure 12 may be placed in parallel connection with this adjustable condenser so that a combination may thus be established corresponding to the complete series-parallel arrangement of Figure 10. At the same time the several elements of Figure 12 may be otherwise used from time to time to provide miniature network elements which may then be used in connection with the simulation of corresponding real network elements, particularly loads.

In this Figure 12 there is provided a unit including the terminals or busbars 624 and 625. This unit includes also the two jacks 626 and 627 into which suitable plugs may be inserted in the usual manner. The inductance element 618, together with its inherent resistance 619, are connected between the busbar 624 and the lead 628, so that the said busbar and lead correspond to the terminals 620 and 621 of Figure 10, respectively. The busbar 624 is connected to the sleeves 629 and 630 of the two jacks 626 and 627, respectively, by the lead 631; and the lead 628 is connected to the ring contact 632 of the jack 626, and to the tip contact 633 of the jack 627 by the leads 634 and 635, respectively. The busbar 625 is connected to the ring contact 636 of the jack 627 and to the contact 637 of said jack by means of the lead 638. This contact 637 is normally in engagement with the tip contact 633 of the jack 627, but such engagement is broken when the plug is inserted into said jack. The busbar 625 may be connected to ground; and the busbar 624 may be connected to the miniature network at such a position as to correspond to one end of the transmission line being simulated.

The adjustable value condenser elements includes the busbars 639 and 640, and the jacks 641 and 642. This adjustable condenser element also includes the fixed value condensers and switching means similar to corresponding parts of the arrangement shown in Figure 6. In the present case, however, I have chosen to illustrate only three decades of condensers and corresponding switching means, and also these parts are connected in somewhat different manner from that shown in Figure 6. In the present case there are provided the three decades 643, 644 and 645, each decade including a three blade, ten position gang switch (having nine working positions and an "off" position), and also including four condensers. These latter are shown at 646, 647, 648, 649, 650, 651, 652, 653, 654, 655, 656 and 657. Conveniently, also these condensers are, respectively of the capacitances shown below, by way of illustration:

| Condenser Number (Figure 12) | Capacity, Microfarads (Illustrative) |
|---|---|
| 646 647 648 649 } Decade No. 1 | 0.0003 0.0006 0.0009 0.0018 |
| 650 651 652 653 } Decade No. 2 | 0.003 0.006 0.009 0.018 |
| 654 655 656 657 } Decade No. 3 | 0.03 0.06 0.09 0.18 |

Without describing in full detail all the condenser combinations which are possible with the illustrated arrangement it may be here stated that this arrangement will, like that of Figure 6, permit of successive condenser groupings from a minimum of 0.0003 microfarad to a maximum of .2997 microfarad, on the assumption that all condensers are of exactly their rated values. It is stated, however, that the arrangement shown in Figure 12 includes the condenser and switch busbars 658 and 659, all of the switch blades being connected to the busbar 658, and the free ends of all the condensers being connected to the busbar 659, so that the proper condenser connections between these busbars are established by simple switch movements.

The busbar 658 is connected to the busbar 639 by the lead 660. The busbar 639 is connected to the sleeve 661 of the jack 641 by the lead 662, and the lead 660 is connected to the lead 662. The busbar 659 is connected to the tip 663 of the jack 642 by the lead 664; and the ring contact 665 of this jack 642 is connected to the busbar 640 by the lead 666. The tip and ring contacts 663 and 665 are normally in connection with each other by the spring contact 667. The busbar 640 is connected to the ring contact 668 of the jack 641 by the lead 669; and the busbar 658 is connected to the sleeve contact 670 of the jack 642 by the lead 671.

With the so-far described connections the following relations may be established:

Upon inserting a patch cord into the jacks 627 and 641 it will be found that, beginning with the lead 628 (or 635) one circuit will be traced through the resistance 619 and inductance 618, busbar 624, and lead 631 to the sleeve contact 630 of the jack 627. The lead 635 is connected to the tip contact of said jack 627, so that thus far we have placed the inductance 618 and its inherent resistance 619 in series between the tip and sleeve contacts of the jack 627. The ring contact 632 of jack 626 is connected to tip contact 633 of jack 627 and sleeve contact 629 of jack 626 is connected to sleeve contact 630 of jack 627. Upon inserting a patch cord into the jack 626 and the jack 641 the following additional circuits are formed:

The tip contact of the jack 627 is connected to the free ends of the condensers of the several decades through the leads 635 and 634, ring contact 632 of jack 626, cord, ring contact 668 of jack 641, lead 669, busbar 640, lead 666, spring contact 667, tip contact 663 of jack 642, and lead 664 to busbar 659 which is in turn connected to the several condensers. Then, the several switch blades are connected as follows; busbar 658, leads 660 and 662 to sleeve contact 661 of jack 641, cord, and sleeve contact 629 of jack 626. Since this sleeve contact 629 is connected to the lead 631, which is in turn connected to the sleeve contact 630 of the jack 627 it follows that the condenser group has been placed in parallel with the resistance-inductance combination 619—618, and thus the series-parallel arrangement of Figure 10 has been reproduced in the connections of Figure 12, but with the condenser group adjustable by proper settings of the several decade switches. In other words, the tip contact 633 of the jack 627 has been connected to busbar 640 and has been made to correspond to the terminal 621 of Figure 10, and the sleeve contact 630 of Figure 12, jack 627, has been connected to busbar 639 and has been made to correspond to the terminal 620 of Figure 10.

In Figure 12 I have also shown the resistance 232, corresponding to the like resistance 232 of Figures 4a and 5 of this case. It is to be noted, however, that upon inserting the plug of the patch cord into the jack 641 of Figure 12 of the present application, this resistance is cut out of the circuit by opening of the spring contact 671a between the tip contact 672 and the ring contact 668 of the jack 641, so that when the arrangement of Figure 10 is simulated in Figure 12 this resistance 232 is cut out of the circuit. By reason of this feature the following arrangement is readily adopted in the entire or complete calculating board ensemble:

A number of units such as shown in Figure 12 may be provided in the calculating board, sufficient to meet all expected network elements to simulate lead elements of a real network circuit in conjugate form, and possibly a few additional such units may be provided. Then when it is found necessary to simulate a transmission line having large distributed capacity, simulation may be effected by selecting one of these units, and connecting same to an inductive unit such as shown by the series resistance-inductance combination 618—619 in the corner of Figure 12, use being made of a patch cord to effect such connection. By this means the several condenser elements may be interchangeably used for simulations of various network load elements in conjugate, and from time to time some of these condenser elements may also be used, in combination with suitable series resistance-inductive units for simulation of cases of distributed capacity in the real network.

It is to be noted that when such a patch cord has been inserted into the jacks 626 and 641, the jack 627 may be used to receive the plug of a cord whereby the complete calculating board connections are established for permitting adjustment of the decade switches, using the current responsive instrument during such adjustments, or for reading charging currents, or for other purposes.

The current responsive instrument 311 may be any one of several types of alternating current responsive indicating instruments. As previously stated, I may wish to use a thermionic amplifier in conjunction with this instrument, or I may employ the arrangement shown in my copending application, Serial No. 770,850, or other suitable intermediate circuit arrangements between the instrument and the remainder of the calculating board to make it possible to ensure readable deflections of such instrument in response to such current values as it is convenient to use in the calculating board circuits herein disclosed and under the conjugate system of operation herein disclosed. Such instruments may be provided with suitable scales such as are shown for example, in Letters Patent, No. 2,301,470.

I claim:

1. In an alternating current calculating board, a circuit for the representation of a real network branch having resistance and inductive reactance, said circuit including a resistance section independently adjustable to simulate the resistance of said real network branch, and a capacitive reactance section independently adjustable to simulate the inductive reactance of said real network branch, in conjugate form, means for the interconnection of a plurality of such circuits to form a network of selected configuration, a potential source, current responsive indicating means, and means for the independent adjustment of said adjustable resistance and adjustable capacitive reactance sections to selected settings as indicated by said current responsive indicating means.

2. In an alternating current calculating board, a circuit for the representation of a real network branch having resistance and inductive reactance, said circuit including a resistance section adjustable to simulate the resistance of said real network branch, and a capacitive reactance section adjustable to simulate the inductive reactance of said real network branch in conjugate form, means for the interconnection of a plurality of such circuits to form a network of selected configuration, a potential source, current responsive indicating means, and means for the adjustment of said adjustable resistance and adjustable reactance sections to selected settings as indicated by said current responsive indicating means.

3. In an alternating current calculating board, a circuit for the representation of a real network branch having resistance and inductive reactance, said circuit including a resistance section adjustable to simulate the resistance of said real network branch, and a capacitive reactance section adjustable to simulate the inductive reactance of said real network branch in conjugate form, means for the interconnection of a plurality of such circuits to form a network of selected configuration, and means for the adjustment of each of said adjustable resistance and adjustable capacitive reactance sections to selected simulating settings.

4. An alternating current calculating board for the solution of actual electrical networks which actual networks include branches having known impedances, said calculating board including a plurality of branches, and means for interconnecting said calculating board branches in a configuration to simulate an actual network, a potential source, and current responsive indicating means, each of said calculating board branches having an impedance which is in a predetermined ratio to the conjugate of the impedance of the corresponding actual network branch.

5. In an alternating current calculating board, a circuit for the simulation of an actual network branch having resistance and reactance by a simulating impedance of equal but opposite impedance angle, said circuit including a substantially non-reactive resistance section independently adjustable to simulate the resistance of said actual network branch, and including a substantially non-resistive reactance section independently adjustable to simulate the reactance of said actual network branch in opposite reactive sense, means for the interconnection of a plurality of such circuits to form a network of selected configuration, a potential source, current responsive indicating means, and means for the independent adjustment of said adjustable resistance and adjustable reactance sections to selected settings as indicated by said current responsive indicating means.

6. In an alternating current calculating board, a circuit for the simulation of an actual network branch having resistance and reactance, said circuit including a non-reactive resistance section adjustable to simulate the resistance of said actual network branch, and a reactance section adjustable to simulate the reactance of said actual network branch in conjugate form, means for the interconnection of a plurality of such circuits to form a network of selected configuration, a potential source, current responsive indicating means, and means for the adjustment of said adjustable resistance and adjustable reactance sections to selected settings as indicated by said current responsive indicating means.

7. In an alternating current calculating board, a circuit for the simulation of an actual network branch having reactance by a simulating impedance of opposite impedance angle, said circuit including a section adjustable to simulate the reactance of said actual network branch in opposite reactive sense, means for the interconnection of a plurality of such circuits to form a network of selected configuration, a potential source, current responsive indicating means, and means for the adjustment of said adjustable sections to selected settings as indicated by said current responsive indicating means.

8. In an alternating current calculating board, a circuit for the simulation of an actual network branch having reactance, said circuit including a section adjustable to simulate the reactance of said actual network branch in conjugate form, means for the interconnection of a plurality of such circuits to form a network of selected configuration, and means for the adjustment of each of said adjustable sections to selected simulating settings.

9. In an alternating current calculating board for the solution of actual alternating current networks by simulation, said actual networks including branches having known impedances, a circuit for the simulation of an actual network branch, said circuit including a substantially non-reactive resistance section independently adjustable to a resistance value which is in a predetermined selected ratio to the resistance of said actual network branch, a substantially non-resistive reactance section independently adjustable to a reactance value which is in the negative of said selected ratio to the reactance of said actual network branch, means for interconnecting a plurality of such circuits to form a network of selected configuration, a potential source, current-responsive indicating means, and means for adjusting each of said adjustable resistance and adjustable reactance sections to selected simulated settings.

JAMES H. STARR.

REFERENCES CITED

The following references are of record in the file of this patent:

UNITED STATES PATENTS

| Number | Name | Date |
|---|---|---|
| 1,167,693 | Hoyt | Jan. 11, 1916 |
| 1,240,213 | Hoyt | Sept. 18, 1917 |
| 1,498,915 | Hoyt | June 24, 1924 |
| 1,767,200 | Bartlett | June 24, 1930 |
| 1,815,629 | Milnor | July 21, 1931 |
| 2,301,470 | Starr | Nov. 10, 1942 |
| 2,323,588 | Enns | July 6, 1943 |